(12) United States Patent
Horie et al.

(10) Patent No.: US 8,151,914 B2
(45) Date of Patent: Apr. 10, 2012

(54) DRIVE SYSTEM

(75) Inventors: Hideaki Horie, Yokosuka (JP); Osamu Shimamura, Yokohama (JP); Takamitsu Saito, Yokohama (JP); Takaaki Abe, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 982 days.

(21) Appl. No.: 12/084,463

(22) PCT Filed: Nov. 1, 2006

(86) PCT No.: PCT/JP2006/321896
§ 371 (c)(1),
(2), (4) Date: Jun. 2, 2008

(87) PCT Pub. No.: WO2007/052714
PCT Pub. Date: May 10, 2007

(65) Prior Publication Data
US 2009/0107746 A1 Apr. 30, 2009

(30) Foreign Application Priority Data
Nov. 4, 2005 (JP) ............... P2005-321553

(51) Int. Cl.
*B60L 11/12* (2006.01)

(52) U.S. Cl. ........................ 180/65.1; 290/16
(58) Field of Classification Search ............ 180/65.1, 180/65.285, 65.29; 290/16
See application file for complete search history.

(56) References Cited

U.S. PATENT DOCUMENTS

| 6,220,383 | B1 | 4/2001 | Muraki et al. |
| 6,927,524 | B2* | 8/2005 | Pyntikov et al. ......... 310/254.1 |
| 2003/0008205 | A1 | 1/2003 | Horie et al. |

FOREIGN PATENT DOCUMENTS

| JP | 11-185831 A | 7/1999 |
| JP | 2000-274240 A | 10/2000 |
| JP | 2003-017127 A | 1/2003 |
| JP | 2003-151510 A | 5/2003 |
| JP | 2004-153875 A | 5/2004 |
| JP | 2004-153897 A | 5/2004 |
| JP | 2005-510995 A | 4/2005 |
| WO | WO 03/047071 A2 | 6/2003 |

* cited by examiner

*Primary Examiner* — J. Allen Shriver, II
*Assistant Examiner* — Erez Gurari
(74) *Attorney, Agent, or Firm* — Foley & Lardner LLP

(57) ABSTRACT

In a vehicle drive system including a motor and a secondary battery, the motor and secondary battery are integrated to provide a drive system having good mountability. In a gap between a cylindrical outer housing (116) and a rotor (112), a layered cylindrical secondary battery is provided within the outer housing. A cylindrical cooling member (180) is further arranged between the rotor and secondary battery.

22 Claims, 6 Drawing Sheets

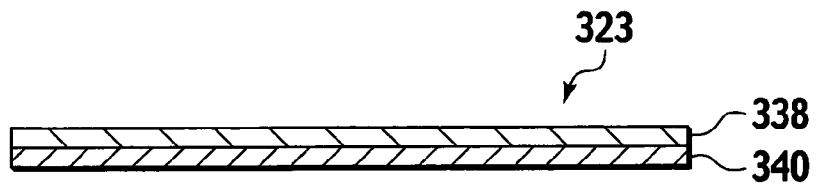
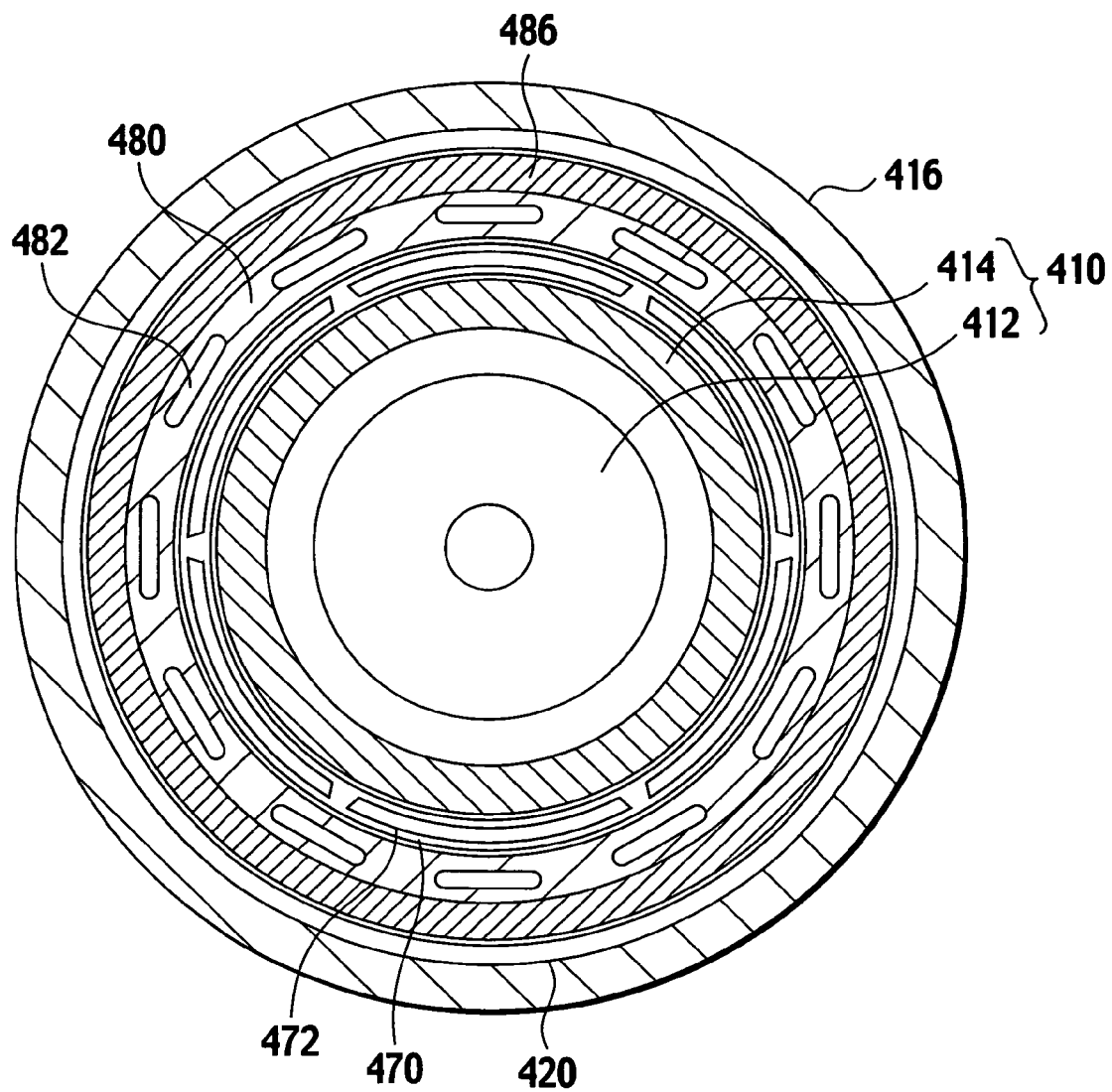

DRIVE SYSTEM

TECHNICAL FIELD

The present invention relates to a drive system.

BACKGROUND ART

For example, a hybrid vehicle includes a motor as a drive source and a secondary battery for supplying electrical power to a motor (for example, see Patent Literature 1).
[Patent Literature 1] Japanese Patent Laid-open Publication No. 11-185831

DISCLOSURE OF THE INVENTION

The motor and secondary battery are separate units, and it is necessary to prepare individual spaces for the same, thus creating large dead space. There is thus a mounting problem.

The present invention was made to solve the problem involved in the aforementioned conventional art, and an object of the present invention is to provide a drive system with good mountability.

To achieve the aforementioned object, the present invention is a drive system including a motor as a driving source; and a secondary battery which is integrated with the motor and supplies power to the motor. The secondary battery includes a plurality of cells layered.

According to the present invention, the motor and secondary battery are integrated. Accordingly, there is no need to prepare individual spaces for the same, and the dead space thereof is small. Moreover, the secondary battery includes a plurality of cells layered and therefore can be easily reduced in size. The secondary battery can be therefore mounted with high flexibility. It is therefore possible to provide a drive system with good mountability.

BRIEF DESCRIPTION OF THE DRAWINGS

FIG. 10 is a cross-sectional view for explaining a method of forming the secondary battery shown in FIG. 7, showing a third component.

FIG. 11 is a cross-sectional view for explaining a drive system according to Embodiment 4.

BEST MODE FOR CARRYING OUT THE INVENTION

Hereinafter, a description is given of embodiments of the present invention with reference to the drawings.

Figure 1:
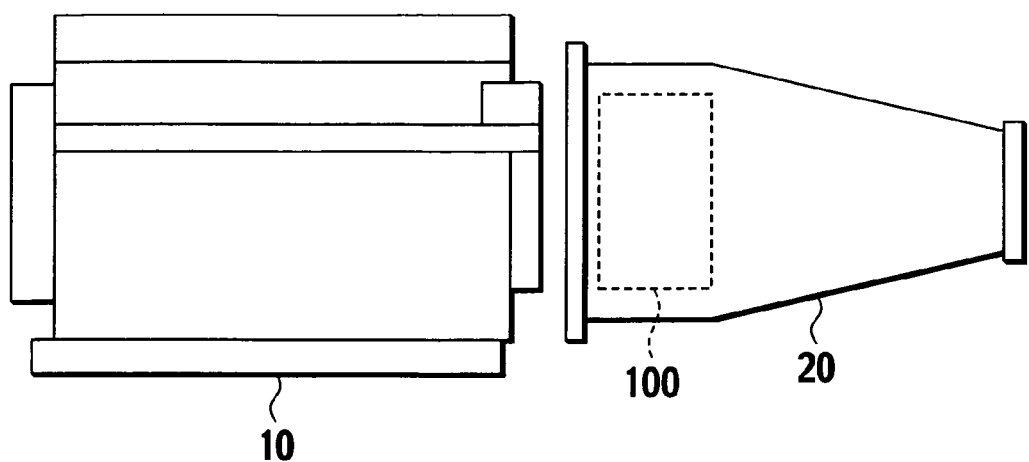
FIG. 1 is a cross-sectional view for explaining a drive system according to Embodiment 1.
Figure 2:
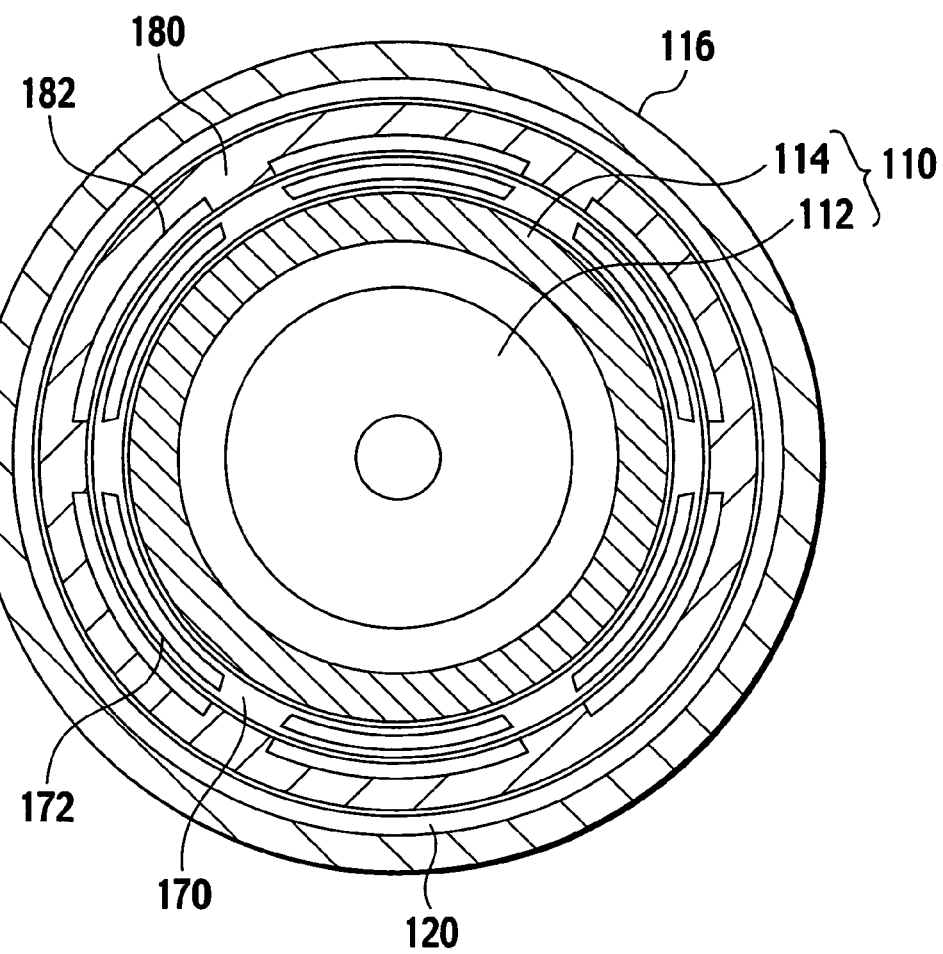
FIG. 2 is a side view for explaining a power generation apparatus to which the drive system shown in FIG. 1 is applied.

FIG. 1 is a cross-sectional view for explaining a drive system according to Embodiment 1. FIG. 2 is a side view for explaining a power generation apparatus to which the drive system shown in FIG. 1 is applied.

A drive system 100 includes a motor 110, a secondary battery 120, a motor controller, and a battery cooling unit and arranged (incorporated) in a transmission section 20 of a power generation apparatus 10.

The power generation apparatus 10 is, for example, an engine of a hybrid vehicle.

The motor 110 includes a rotor 112 and a cylindrical rotor housing 114 accommodating the rotor 112. In the rotor housing 114, a winding for generating a magnetic field is arranged.

The secondary battery 120, which is used to supply power to the motor 110, is arranged in adjacent to a cylindrical outer housing 116 facing the outside and has a substantially cylindrical shape.

The motor controller includes an inverter case 170 arranged in adjacent to an outer periphery of the rotor housing 114. The inverter case 170 is cylindrical and provided with an inverter 172 including a SiC switching element. The inverter 172 is used to convert direct current outputted from the secondary battery 120 into alternate current and drive the motor 110.

The SiC switching element is preferable because the SiC switching element can be driven with large current and provides high speed response. As the SiC switching element, for example, an IGBT (an insulated gate bipolar transistor) or an FET (a field effect transistor) can be used.

The battery cooling unit includes a cooling jacket 180 arranged between the secondary battery 120 and inverter case 170 (inverter 172). The cooling jacket 180 is a cylindrical member formed of a material having a good thermal conductivity and includes a channel 182 through which a cooling medium flows. The channel 182 is connected to an external cooling medium plumbing system (not shown). The cooling medium is composed of gas or liquid. For example, the gas is compressed air, and the liquid is water or antifreeze such as oil and ethylene glycol.

The battery cooling unit maintains the temperature of the secondary battery 120 at 50 to 100° C. and controls the temperatures of the motor 110 and inverter 172 to not more than 120° C. considering temperature tolerances of the motor 110, inverter 172, and secondary battery 120.

Figure 3:
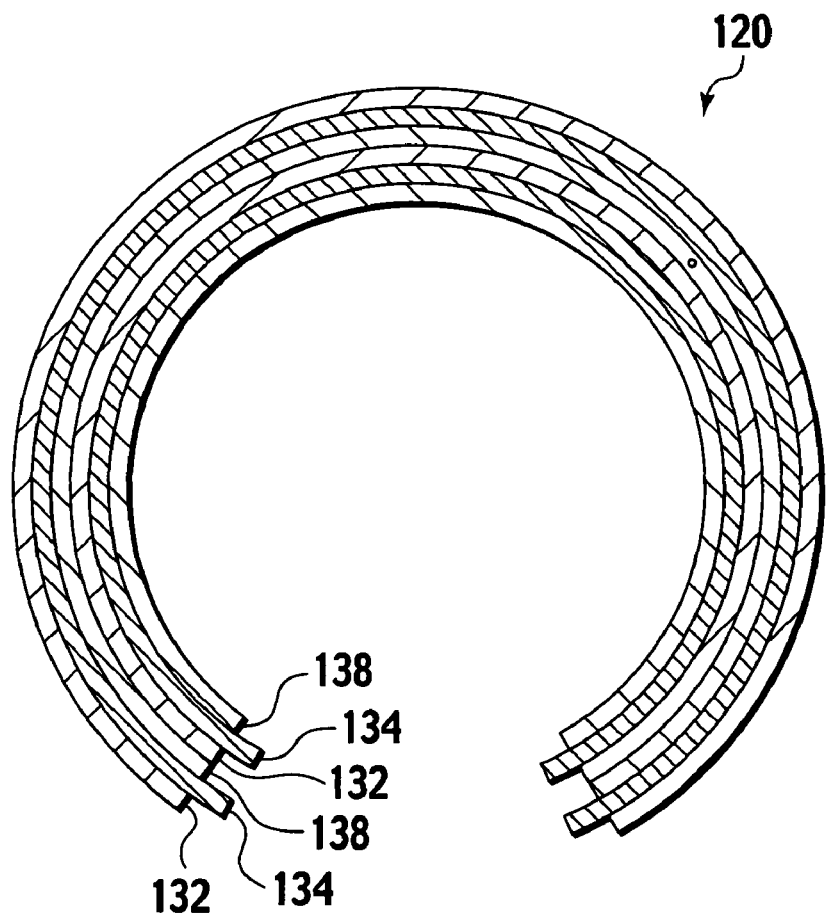
FIG. 3 is a cross-sectional view for explaining a secondary battery included by the drive system shown in FIG. 1.
Figure 4:
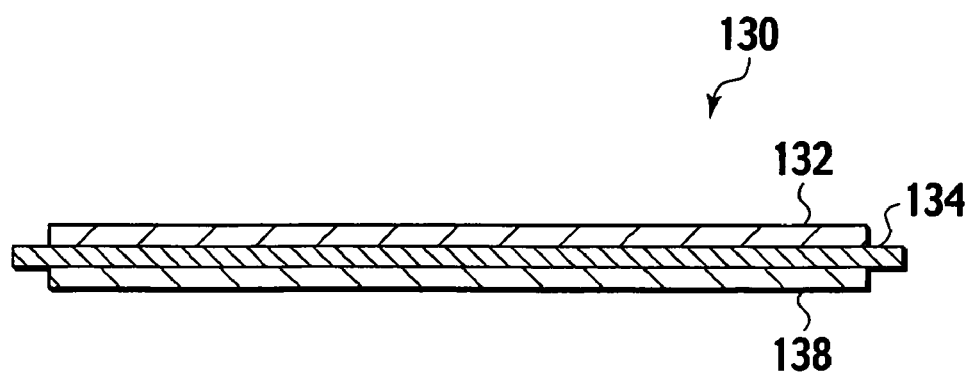
FIG. 4 is a side view for explaining a cell included by the secondary battery shown in FIG. 3.

FIG. 3 is a cross-sectional view for explaining a secondary battery included by the drive system shown in FIG. 1. FIG. 4 is a side view for explaining a cell included by the secondary battery shown in FIG. 3.

The secondary battery 120 includes a plurality of cells 130 layered. A part of each cell 130 where positive and negative electrodes are arranged has a curvature. This is preferable for vibration and thermal stress relaxation.

The cells 130 are connected in series to constitute an assembled battery and increase available voltage. This is preferable because: the motor size depends mainly on the coil winding; and in motors having same power, the higher the driving voltage is, the smaller the current is, and the coil winding in the motor can be made thinner.

The cells 130 are stacked in not less than three and not more than 400 layers. Preferably, the secondary battery 120 has a power density of not less than 3 kW/L and a ratio of output to capacity of not less than 30 (1/h).

Each of the cells 130 is a lithium ion cell and includes a positive electrode 132 having a cathode active material layer and an electron conducting layer, an electrolyte 134, and a negative electrode 138 having an anode active material layer and an electron conducting layer. An electrolyte 134 is composed of a gel electrolyte or a solid electrolyte.

Preferably, each pair of electrodes including the cathode and anode active material layers, electrolyte 134, and electron conducing layers has a thickness of not more than 50 µm.

Each cell 130 is formed by applying the positive and negative electrodes 132 and 138 onto the electrolyte 134 by an ink-jet method. Specifically, in each cell 130, in a same way as that of printing an image using an inkjet printer, materials necessary for forming the layers constituting the positive and negative electrodes 132 and 138 are selectively injected onto the electrolyte 134 as a substrate to form the layers sequentially starting from the layer adjacent to the electrolyte 134. The method of forming the cells 130 is not limited to application by the ink-jet method and can be a laminating method such as vacuum deposition.

The electrolyte 134 is composed of an electrolyte containing a heat-resistant polymer material with a melting temperature of not less than 100° C. or an electrolyte containing a PEO (polyethylene oxide) polymer material. Preferably, the heat-resistant polymer material is polyvinylidene fluoride (PVdF), for example.

The cathode active material layer contains a cathode active material, a conductive agent to increase electronic conductivity, a lithium salt to increase ionic conductivity, a binder, a polymer gel electrolyte, and the like. The cathode active material is a lithium-transition metal composite oxide, for example.

The anode active material layer contains an anode active material, a conductive agent to increase electronic conductivity, a lithium salt to increase ionic conductivity, a binder, a polymer gel electrolyte (a polymer matrix, electrolyte liquid, or the like), and the like. The anode active material is, for example, carbon or a lithium-transition metal composite oxide.

The electronic conductive layer has a function to block ions and contains, for example, metal, conductive polymer, conductive rubber, or the like.

As described above, in the drive system 100 according to Embodiment 1, the motor 110, secondary battery 120, inverter 172, and battery cooling unit are integrated. There is no need to individually prepare spaces for the above components, and the dead space thereof is small. Moreover, the secondary battery 120 includes the plurality of cells 130 layered and can be therefore easily reduced in size. Accordingly, the secondary battery 120 can be mounted with high flexibility. It is therefore possible to provide a drive system with good mountability.

Moreover, the drive system 100 does not need a heavy electric cable connecting the motor 110 and secondary battery 120, and power loss due to the heavy electric cable can be reduced. Furthermore, voltage can be adjusted by changing the number of layers of the cells 130, and this drive system 100 can be easily applied to various motors different in required maximum voltage.

The drive system 100 can be arranged in adjacent to the transmission section 20 of the power generation apparatus 10.

The inverter 172 can be provided as a separate unit as needed. In such a case, the battery cooling unit (cooling jacket) is arranged between the secondary battery 120 and rotor housing 114.

The cooling jacket 180 of the battery cooling unit can be arranged in adjacent to the outer periphery of the secondary battery 120.

The channel 182 through which the cooling medium flows can be a gap formed between the rotor housing 114 and outer housing 116, for example, a gap formed between the secondary battery 120 and inverter case 170. The battery cooling unit can be provided as a separate unit or omitted as needed.

Figure 5:
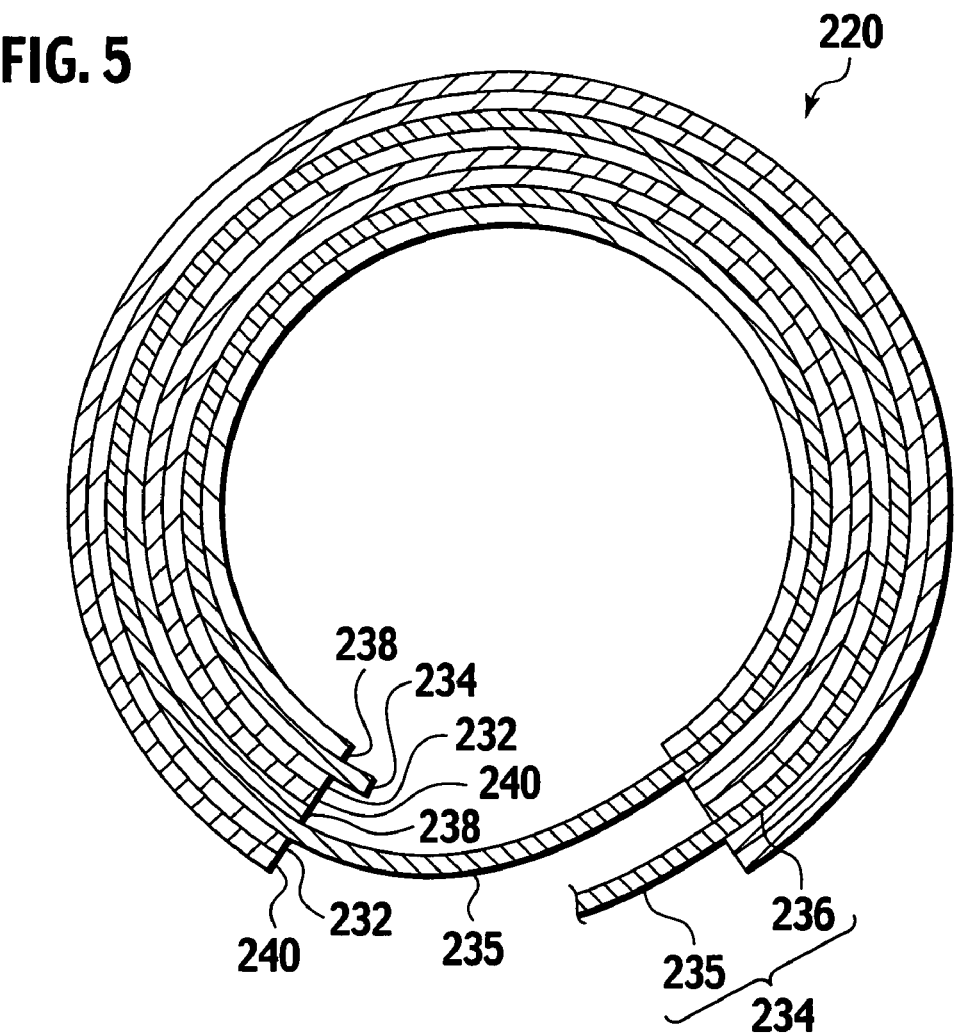
FIG. 5 is a cross-sectional view for explaining a secondary battery according to Embodiment 2.
Figure 6:
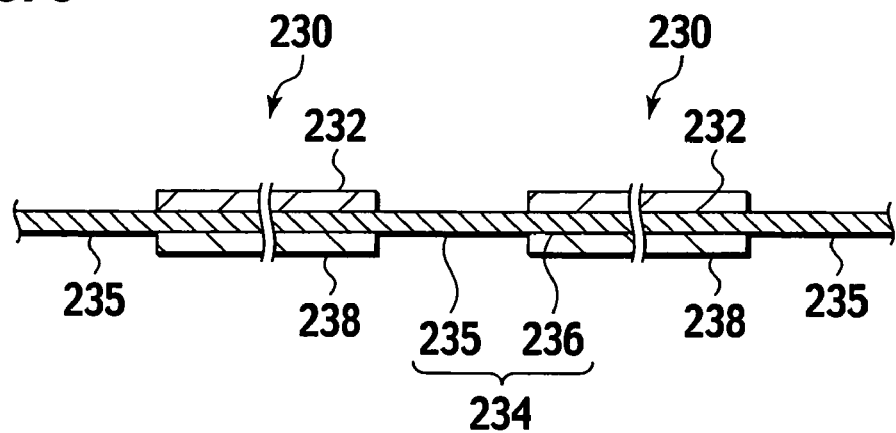
FIG. 6 is a side view for explaining a cell included by the secondary battery shown in FIG. 5.

FIG. 5 is a cross-sectional view for explaining a secondary battery according to Embodiment 2. FIG. 6 is a side view for explaining cells included by the secondary battery shown in FIG. 5. Members having the same functions as those of Embodiment 1 are indicated by similar numerals below, and descriptions thereof are properly omitted to prevent redundant descriptions.

Embodiment 2 differs from Embodiment 1 in the structures of cells 230 and a secondary battery 220 as a whole.

Each of the cells 230 includes a positive electrode 232, an electrolyte 234, and a negative electrode 238. The electrolyte 234 is lengthy and includes processed portions 235 subjected to an anti-conduction treatment and unprocessed portions 236. The plurality of processed portions 235 are arranged at predetermined intervals.

In the case of using a gel electrolyte composed of a separator and a gelled electrolyte, the anti-conduction treatment includes, for example, not adding gel to the processed portions or performing a treatment to repel the gelled electrolyte for the processed portions of the separator. In the case of using a solid polymer electrolyte, the anti-conduction treatment can include performing heating to affect the molecular structure and reduce ionic conductivity.

The plurality of positive and negative electrodes 232 and 238 are respectively arranged on one and the other surfaces of the electrolyte 234, for example, by application. The positive and negative electrodes 232 and 238 are arranged to be aligned on the unprocessed portions 236. In other words, the electrolyte 234 is shared by the plurality of cells 230.

The secondary battery 220 is formed by wrapping around the cooling jacket the electrolyte 234, on which the plurality of positive and negative electrodes 232 and 238 are arranged. The cells 230 are therefore easily layered.

The sum of length of the unprocessed portions 236, or length of the positive electrodes 232 (the negative electrodes 238), and length of the processed portions 235 is made substantially equal to outer circumferential length of the cooling jacket. Accordingly, the positive electrode 232 of each cell 230 inside overlaps the negative electrode 238 of the adjacent cell 230 outside. In order to obtain a good contact between the positive and negative electrodes 232 and 238 to prevent an increase in resistance, collector foils 240 are arranged in surfaces where the positive and negative electrodes 232 and 238 overlap each other at each turn. The collector foils 240 are, for example, copper, aluminum, stainless steel, conductive polymer, and conductive rubber.

In the case where the thickness of the secondary battery 220 is increased according to the number of turns (the number of stacked layers) and the diameter of the bottom layer is greatly different from that of the top layer to cause failures in the overlaps between the positive and negative electrodes 232 and 238, such a disadvantage can be solved by changing the range of application or width of each unprocessed sections 236.

As described above, according to Embodiment 2, the cells 230 can be easily layered.

Figure 7:
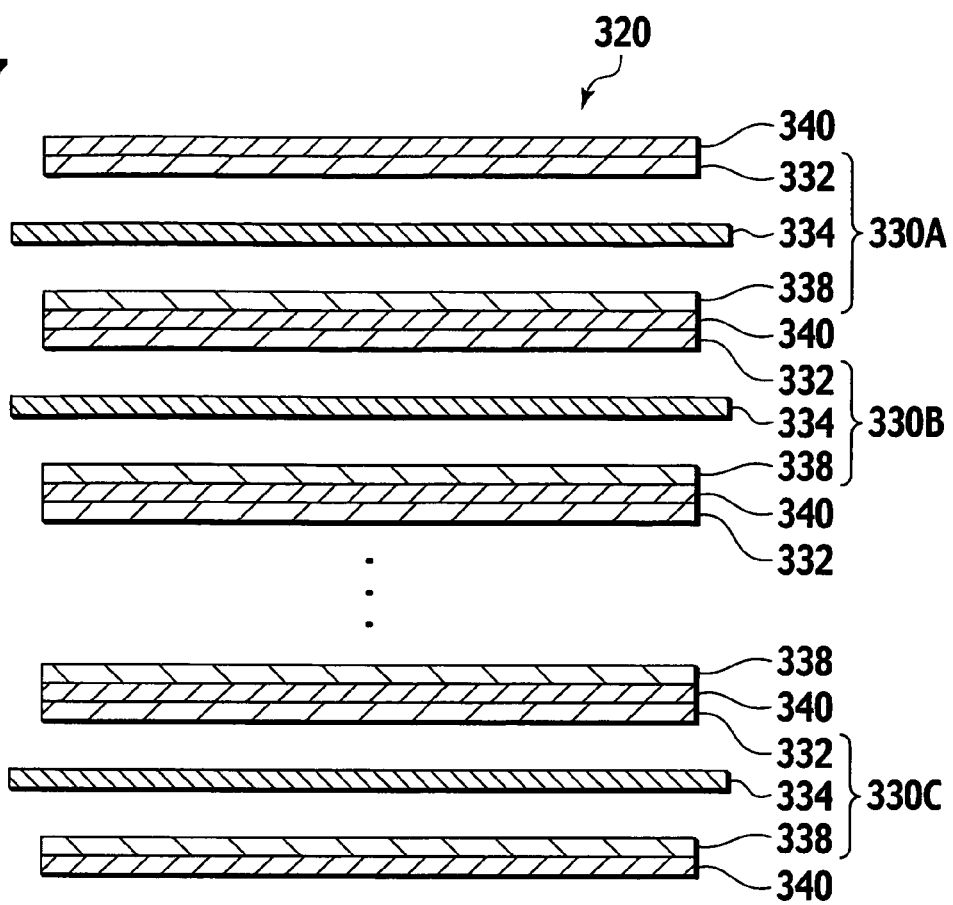
FIG. 7 is an exploded view for explaining a secondary battery according to Embodiment 3.
Figure 8:
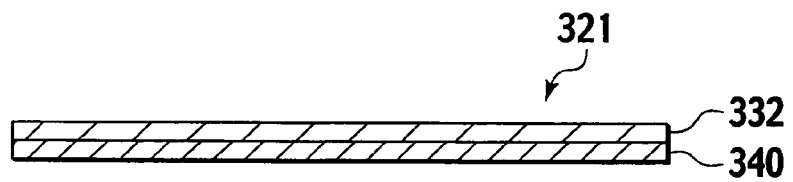
FIG. 8 is a cross-sectional view for explaining a method of forming the secondary battery shown in FIG. 7, showing a first component.
Figure 9:
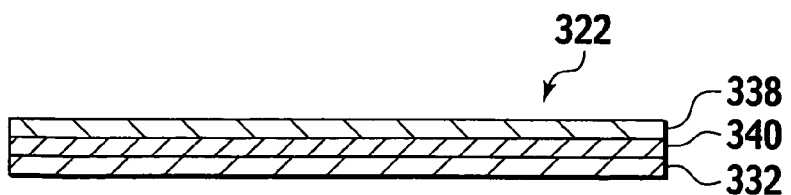
FIG. 9 is a cross-sectional view for explaining a method of forming the secondary battery shown in FIG. 7, showing a second component.

FIG. 7 is an exploded view for explaining a secondary battery according to Embodiment 3. FIGS. 8 to 10 are cross-sectional views for explaining a method of forming the secondary battery shown in FIG. 7, respectively showing first to third components.

Embodiment 3 differs from Embodiment 1 in terms of structures of the cells 330 and a secondary battery 320 as a whole.

The secondary battery 320 includes the cells 330 and collector foils 340. The collector foils 340 are arranged on a positive electrode 332 of a top cell 330A, under a negative electrode 338 of a bottom cell 330C, and between each adjacent pair of positive and negative electrodes 332 and 338 of the cells 330B in the intermediate positions. The cells 330A to 330C are connected in series to secure required voltage. Reference numeral 334 denotes electrolytes.

The secondary battery 320 is formed, for example, by using three components 321 to 323.

The first component 321 includes one of the collector foils 340 and one of the positive electrodes 332 provided on one side of the collector foil 340. The second component 322 includes: one of the collector foils 340; one of the positive electrodes 332 provided for one side of the collector foil 340; and one of the negative electrodes 338 provided for the other side of the collector foil 340. The third component 323 includes one of the collector foils 340 and one of the negative electrodes 338 provided for one side of the collector foil 340. The positive and negative electrodes 332 and 338 are arranged on the collector foils 340, for example, by application.

The third component 323 is arranged at the bottom. The collector foil 340 of the third component 323 faces the outside and constitutes a bottom layer of the secondary battery 320. On the negative electrode 338 of the third component 323, an electrolyte 334 is arranged.

On the above electrode 334, the second component 322 is arranged. The positive electrode 332 of the second component 322 faces the electrolyte 334. On the negative electrode 338 of the second component 322, one of the electrolytes 334 is arranged.

Such layering of the second component 322 and electrolyte 334 is repeated a predetermined number of times as needed. The collector foils 340 are thus individually arranged between each adjacent pair of cells 330. Thereafter, on the electrolyte 334, the first component 321 is arranged. The positive electrode 332 of the first component 321 faces the electrolyte 334. The collector foil 340 of the first component 321 faces the outside and constitutes a top layer of the secondary battery 320.

In such a manner, according to Embodiment 3, the collector foils 340 can be easily arranged individually between each adjacent pair of the cells 330.

FIG. 11 is a cross-sectional view for explaining a drive system according to Embodiment 4.

Embodiment 4 differs from Embodiment 1 in terms of the structure of the battery cooling unit as a whole. To be specific, the battery cooling unit includes a cooling jacket 480 and a heat shield layer 486.

The cooling jacket 480 is arranged around an inverter case 470 in adjacent to the same. The heat shield layer 486 is arranged between the cooling jacket 480 and a secondary battery 420 and covers the cooling jacket 480.

The heat shield layer 486 is made of a material with a thermal conductivity smaller than that of a material constituting the inverter case 470 and controls heat conduction from the inverter case toward the secondary battery. Accordingly, it is easy to maintain the temperature of the secondary battery 420 at 50 to 100° C. and control the temperature of a motor 410 and an inverter 472 to not more than 120° C.

Reference numerals 412, 414, 416, and 482 denote a rotor, a rotor housing, an outer housing, and a channel, respectively.

As described above, according to Embodiment 4, the temperature of the secondary battery 420 can be easily managed.

Figure 12:
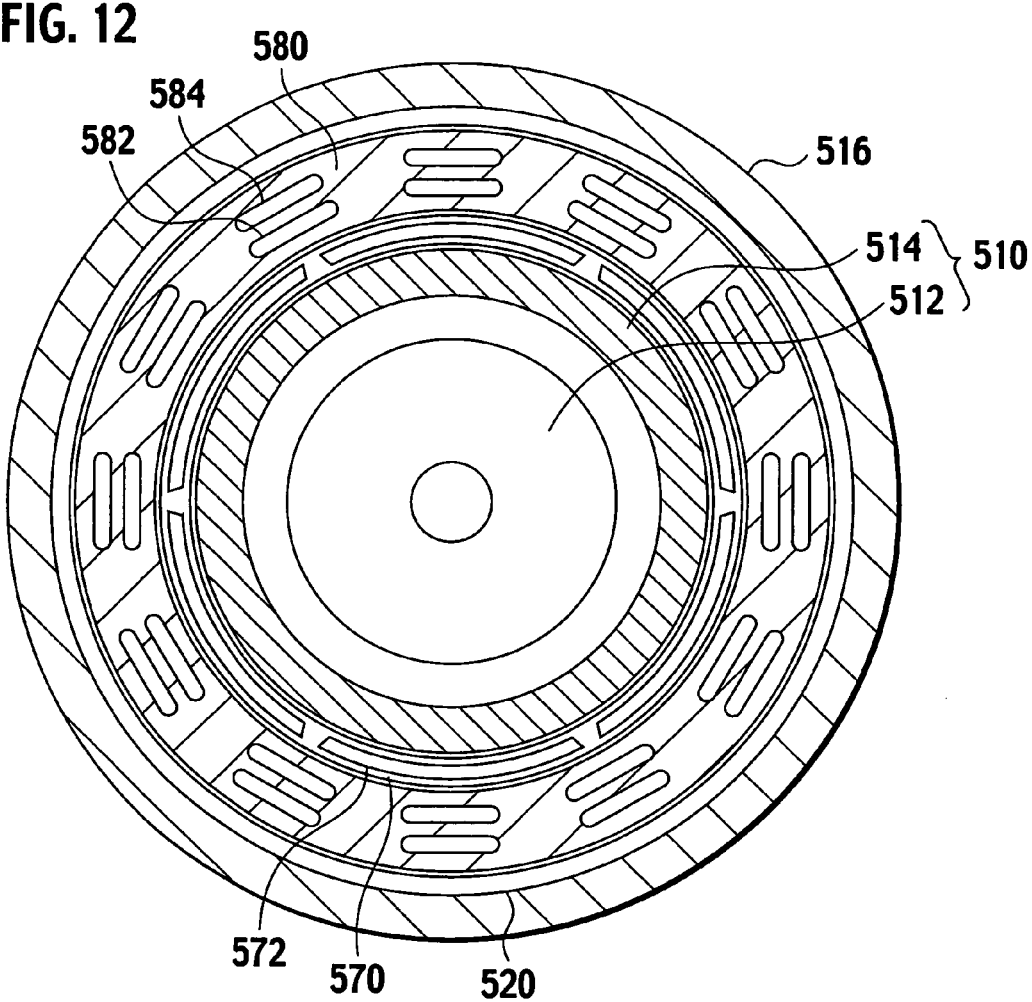
FIG. 12 is a cross-sectional view for explaining a drive system according to Embodiment 5.

FIG. 12 is a cross-sectional view for explaining a drive system according to Embodiment 5.

Embodiment 5 differs from Embodiment 1 in terms of the structure of the battery cooling unit as a whole. To be specific, the battery cooling unit includes a cooling jacket 580 of a two layer structure which has an inner channel 582 and an outer channel 584.

The inner channel 582 is arranged in an inner layer facing an inverter case 570. The outer channel 584 is arranged in an outer layer facing a secondary battery 520.

The cooling jacket 580 is connected to an external cooling medium plumbing system (not shown). A cooling medium is introduced through the outer channel 584 to the inner channel 582 to cool the secondary battery 520 and then cool the inverter 572 (the inverter case 570). In other words, since the cooling medium cools the secondary battery 520 at first, the secondary battery 520 can be easily maintained at low temperature.

On the other hand, the cooling medium cools the secondary battery 520 to increase in temperature. However, the target temperature of the secondary battery 520 is 50 to 100° C. while the target temperatures of the inverter 572 and a motor 510 are not more than 120° C. Accordingly, the cooling medium already used to cool the secondary battery 520 can be used to cool the inverter 572 and motor 510.

Reference numerals 512, 514, and 516 denote a rotor, a rotor housing, and an outer housing, respectively.

As described above, according to Embodiment 5, the secondary battery 520, inverter 572, and motor 510 can be efficiently cooled.

When the inverter 572 is provided as a separate unit, the battery cooling unit (cooling jacket) is arranged between the secondary battery 520 and rotor housing 514 and cools the secondary battery 520 and then motor 510 (the rotor housing 514).

The cooling medium can be engine cooling water cooled by a radiator of the hybrid vehicle. For example, the cooling jacket 580 is connected to an engine cooling water circulation system, and the engine cooling water is introduced through the outer channel 584 into the inner channel 582 and then returned to the cooling jacket of the engine, thus making it possible to cool the secondary battery 520, inverter 572, and motor 510.

Figure 13:
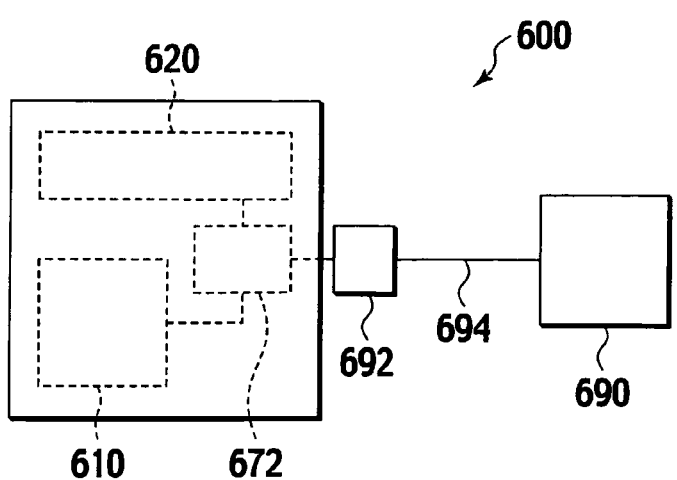
FIG. 13 is a cross-sectional view for explaining a drive system according to Embodiment 6.

FIG. 13 is a conceptual view for explaining a drive system 600 according to Embodiment 6.

Embodiment 6 differs from Embodiment 1 in further including an external power source 690 as a whole.

The external power source 690 is a large capacity secondary battery and is connected to an inverter 672 via a voltage increasing circuit (a DC/DC inverter) 692. The external power source 690 is used to assist the secondary battery 620.

It is therefore possible to easily build up various systems by sharing necessary functions with the external power source 690 and secondary battery 620 integrated with the motor 610. For example, it can be configured so that the external power source 690 is used during low load operation while the secondary battery 620 is used during instantaneous high load operation.

The voltage increasing circuit 692 is preferred because the capacity of the cable 694 connecting the external power source 690 and inverter 672 is reduced to allow the cable 694 to be laid advantageously but can be properly omitted.

As described above, according to Embodiment 6, the external power source 690 is further provided, and therefore the system can be built up with high flexibility.

The present invention is not limited to the aforementioned embodiments and can be variously modified within a scope of the claims.

For example, each secondary battery can be composed of a composite assembled battery including a plurality of cells connected in series and a plurality of cells connected in parallel. Moreover, Embodiment 6 can be properly combined with each of Embodiments 1 to 5.

INDUSTRIAL AVAILABILITY

According to the present invention, the motor and secondary battery are integrated. Accordingly, there is no need to prepare individual spaces for the same, and the dead space is small. Moreover, the secondary battery includes a plurality of cells layered and therefore can be easily reduced in size. The secondary battery can be therefore mounted with high flexibility. It is therefore possible to provide a drive system including good mountability.

What is claimed is:

1. A drive system comprising:
a motor as a driving source; and
a secondary battery which is integrated with the motor and supplies power to the motor,
wherein the secondary battery includes a plurality of cells arranged in a layered fashion, and
wherein the secondary battery is arranged between an outer housing facing the outside and a cylindrical rotor housing accommodating a rotor of the motor.

2. The drive system according to claim 1, wherein the cells are connected in series.

3. The drive system according to claim 1, wherein a portion of each of the cells where positive and negative electrodes are arranged has a curvature.

4. The drive system according to claim 1, wherein the cells are stacked in not less than three layers and not more than 400 layers.

5. The drive system according to claim 1, wherein each of the cells is a lithium ion cell.

6. The drive system according to claim 5, wherein the lithium ion cell includes an electrolyte containing a polymer material with a melting temperature of not less than 100° C.

7. The drive system according to claim 5, wherein the lithium ion cell includes an electrolyte containing a polyethylene oxide polymer material.

8. The drive system according to claim 1, further comprising:
a motor controller arranged adjacent to the motor.

9. The drive system according to claim 8, wherein the motor controller includes an inverter.

10. The drive system according to claim 9, wherein the inverter is arranged between the secondary battery and the rotor housing.

11. The drive system according to claim 9, wherein the inverter includes a SiC switching device.

12. The drive system according to claim 1, further comprising:
a battery cooling unit cooling the secondary battery.

13. The drive system according to claim 1, further comprising:
a battery cooling unit to cool the secondary battery, wherein the battery cooling unit is arranged between the secondary battery and the rotor housing.

14. The drive system according to claim 13, wherein the battery cooling unit includes a channel through which a cooling medium comprising of gas or liquid flows.

15. A drive system comprising:
a motor as a driving source;
a secondary battery which is integrated with the motor and supplies power to the motor; and
a battery cooling unit to cool the secondary battery, wherein the battery cooling unit is arranged between the secondary battery and a rotor housing and includes a channel through which a cooling medium comprising gas or liquid flows,
wherein the secondary battery of cells arranged in a layered fashion, and
wherein the channel includes: an inner channel arranged on a rotor housing side; and an outer channel arranged on a secondary battery side, and the cooling medium is introduced through the outer channel into the inner channel to cool the secondary battery and then cool the rotor housing.

16. A drive system comprising:
a motor as a driving source;
a secondary battery which is integrated with the motor and supplies power to the motor;
a motor controller arranged adjacent to the motor and including an inverter, wherein the inverter is arranged between the secondary battery and a rotor housing; and
a battery cooling unit to cool the secondary battery, wherein the battery cooling unit is arranged between the inverter and the secondary battery,
wherein the secondary battery includes a plurality of cells arranged in a layered fashion.

17. The drive system according to claim 16, wherein the battery cooling unit includes a channel through which a cooling medium comprising gas or liquid flows.

18. The drive system according to claim 17, wherein the channel includes: an inner channel arranged on an inverter side; and an outer channel arranged on a secondary battery side, and the cooling medium is introduced through the outer channel into the inner channel to cool the secondary battery and then cool the inverter.

19. The drive system according to claim 1, wherein the drive system is arranged in a transmission section of a power generation apparatus or arranged adjacent to the transmission section.

20. The drive system according to claim 19, wherein the power generation apparatus is an engine of a hybrid vehicle.

21. The drive system according to claim 14, wherein the drive system is arranged in a hybrid vehicle and the cooling medium is engine cooling water cooled by a radiator of the hybrid vehicle.

22. The drive system according to claim 1, wherein in at least one plane perpendicular to a rotational axis of the rotor:
the outer housing, surrounds and is arranged radially outward from the secondary battery, and
the secondary battery circumferentially surrounds and is arranged radially outward from the cylindrical rotor housing.

* * * * *